US007443621B2

United States Patent
Auell et al.

(10) Patent No.: US 7,443,621 B2
(45) Date of Patent: Oct. 28, 2008

(54) BALANCING METHOD FOR COLOR WHEEL

(75) Inventors: Adam Auell, Morrison, CO (US); Will Moss, Littleton, CO (US); Nick Cunningham, North Logan, UT (US)

(73) Assignee: OC Oerlikon AG, Balzers (LI)

( * ) Notice: Subject to any disclaimer, the term of this patent is extended or adjusted under 35 U.S.C. 154(b) by 0 days.

(21) Appl. No.: 11/556,253

(22) Filed: Nov. 3, 2006

(65) Prior Publication Data

US 2007/0236816 A1  Oct. 11, 2007

Related U.S. Application Data

(60) Provisional application No. 60/733,750, filed on Nov. 4, 2005.

(51) Int. Cl.
*G02B 5/22* (2006.01)
(52) U.S. Cl. .................... 359/891; 359/892
(58) Field of Classification Search ............ 359/891
See application file for complete search history.

(56) References Cited

U.S. PATENT DOCUMENTS

| 5,868,482 | A | 2/1999 | Edlinger et al. | |
| 6,598,977 | B1 * | 7/2003 | Chen | 353/31 |
| 6,705,733 | B1 | 3/2004 | Yu et al. | |
| 6,747,803 | B2 | 6/2004 | Hung | |
| 6,914,734 | B1 * | 7/2005 | Kao et al. | 359/892 |
| 6,958,870 | B1 * | 10/2005 | Nguyen | 359/892 |
| 2003/0035218 | A1 | 2/2003 | Hung | |
| 2004/0095767 | A1 * | 5/2004 | Ohmae et al. | 362/293 |
| 2006/0126198 | A1 * | 6/2006 | Niwa et al. | 359/892 |

FOREIGN PATENT DOCUMENTS

JP   2004-325721 A   11/2004

OTHER PUBLICATIONS

Anon.: "Balancing Primer" Mechanical Power Transmission Association, Elastomeric Coupling Division Technical Information Bulletin, [online] 2003, XP002418628 US. Retrived from the Internet: URL:http://www.mpta.org/MPTABalancingPrime r.pdf> [retrieved on Feb. 6, 2007]. The whole document.
International Search Report for PCT/EP2006/010497, dated Feb. 16, 2007.

* cited by examiner

*Primary Examiner*—Stephone B. Allen
*Assistant Examiner*—Jade Callaway
(74) *Attorney, Agent, or Firm*—Pearne & Gordon LLP

(57) ABSTRACT

A color wheel is provided for use in the illumination system of a projector. The color wheel includes a rotor and a motor for rotating the rotor, the rotor includes a ring shaped translucent area formed by color filter segments, the translucent area being adapted to continuously extend into a light path as the rotor is rotated, the rotor in a first plane perpendicular to the axis of rotation further includes first means for balancing, the rotor in a second plane perpendicular to the axis of rotation further includes second means for balancing, wherein the first and the second plane are spaced apart. Due to the dual plane balancing means, the color wheel is better balanced.

9 Claims, 3 Drawing Sheets

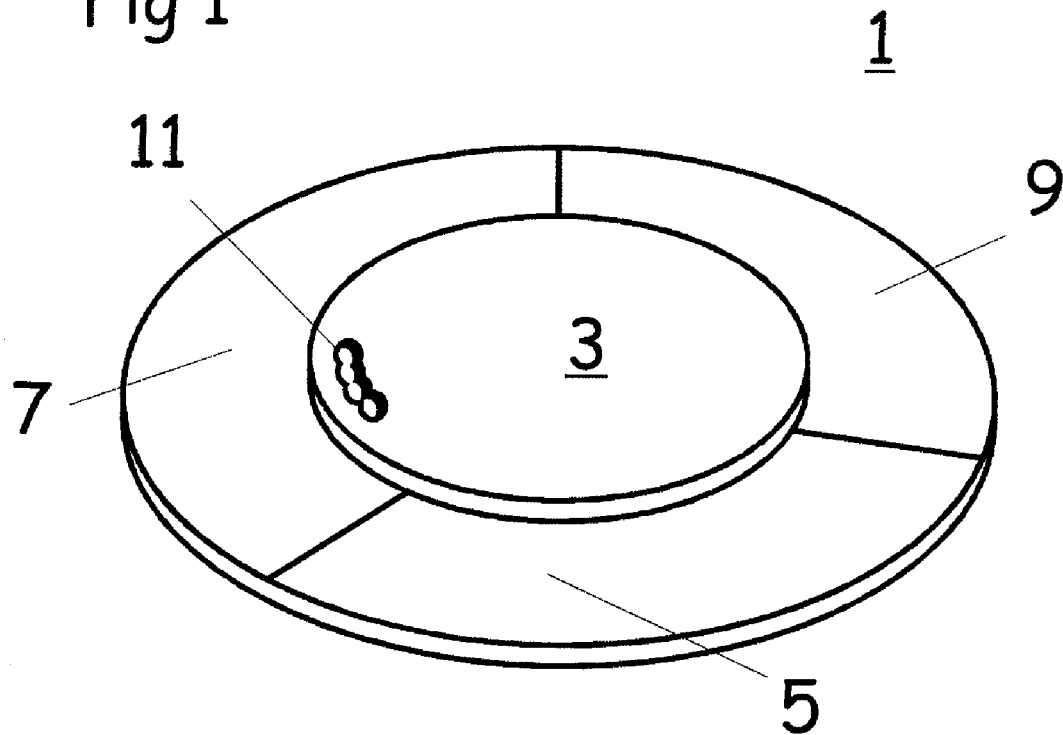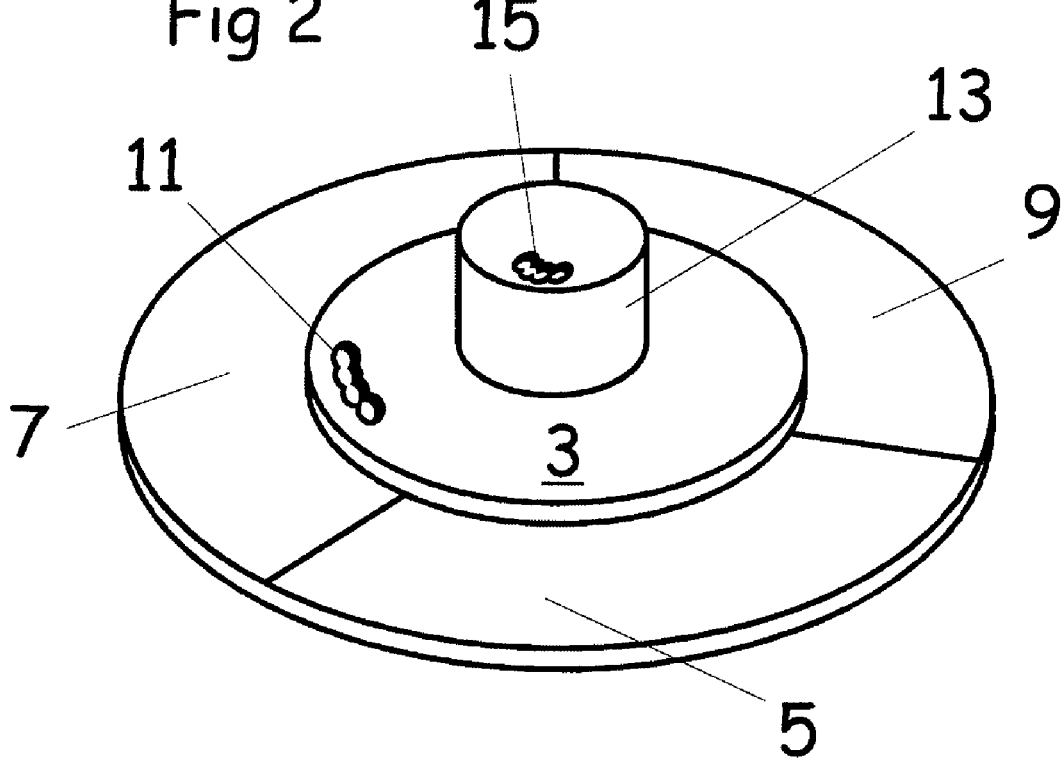

BALANCING METHOD FOR COLOR WHEEL

FIELD

This disclosure relates to a rotatable color wheel for use in projector systems to enable color sequential illumination of an image panel.

BACKGROUND

Most of the image projection apparatus for producing colored images on a screen only comprise one image panel: In order to form a colored image the panel needs to be sequentially illuminated with light beams of different colors. If the sequence is displayed fast enough the human eye is not able to timely resolve the resulting color image sequence and results in the impression of a colored image. One method to realize the required sequential illumination is to place into the illumination path dichroic filter segments secured on a rotatable disc shaped carrier. This forms a color disc which is typically connected to a motor. The assembly of such a color disc and the motor is called color wheel. Since the rotation of such a color disc needs to be quite fast, balancing of such a color disc becomes an issue.

In a first approximation the color disc can be described as a rigid disc shaped rotor. The state of the art solution to balance a disc shaped rotor is to add or to remove balancing weight separated from the axis. The straight forward way to perform such a balancing is to drill holes and thereby remove material.

To perform material removal, the color wheel is attached to a balancing machine which has a fixture to hold it. The color wheel is spun up and the machine is allowed to detect the residual imbalance of the color disc. It then outputs a mass value and angular location to correct for the imbalance. An operator then drills out the appropriate amount of material based on experience. The process is repeated until the color wheel is balanced to a specific level.

To perform material addition, a similar process is performed, but for imbalance correction, material such as lead or adhesive can be added to the color disc. Material addition is typically 180° from a material removal imbalance location.

In U.S. Pat. No. 6,747,803 one or more annular grooves are disposed on the external surface of the disc shaped carrier. This allows one to add a balancing substance into the annular grooves to balance the color wheel.

One of the difficulties is to find a method of how to accurately balance the wheel. In JP 2004325721 a color wheel is pinched and held between a support table and a pressing plate and driven with a motor. The pressing plate is provided with balance adjustment ribs and recessed parts. The balance adjustment ribs are so arranged to be dispersing in circumferential direction and extending in radial direction. The recessed parts are provided at positions corresponding to the balance adjustment ribs and approach to the outer peripheral edge of the pressing plate so that a space is formed between respective balance adjustment ribs and the pressing plate. The balance adjustment ribs are cut into a necessary length from the outer peripheral side by inserting such a multipurpose cutting tool as a nipper into the recessed parts.

PROBLEM TO BE SOLVED

Typically a color disc is described as a disc shaped rotor. If such a disc shaped rotor is not balanced the center of mass is not aligned with the rotation axis. Therefore in order to balance the disc shaped rotor a balancing mass is added or removed thereby moving the center of mass to the rotation axis.

Color discs are typically rotated at operation speeds between 7000 rpm and 15000 rpm. Unfortunately at these speeds this state of the art balancing method often is not sufficient and the bearings of the wheel suffer during rotation. This results in additional vibration contribution. In some cases it even results in a relatively short lifetime of the color wheel.

It is therefore a goal of the present invention to provide an improved color wheel and an improved balancing method in order to reduce vibration issues as well as increase lifetime of the wheel.

SUMMARY OF THE INVENTION

As mentioned before typically color discs are described as rotating discs. However, since every realistic rotator has a finite thickness even a very thin disc can be expressed as a series of two or more disc shaped rotors. Connecting the centers of masses of each of these discs leads to the center of mass line. In the case of the typical color disc this center of mass line is, compared to the radial dimensions of the wheel, quite small and single plane balancing seems to be the adequate balancing methods. Nevertheless, as the inventors surprisingly found, dual plane balancing, as typically used only for thick rotators, exhibits improved results for rotating color discs. Therefore the inventive wheel according to the present invention comprises balancing means at a first plane which is perpendicular to the rotation axis and in addition balancing means at a second plane which is spaced apart from the first plane and which is as well perpendicular to the rotation axis. Color wheels according to the present invention comprise therefore dual and or multiple plane balancing features. Such features could be for example adding or removal of material.

When the inventors tried to apply this dual balancing plane approach, they found that it is quite difficult to apply the second balancing plane. They finally realized that the origin of the difficulties is the fact that, due to geometrical restriction of the color wheel the two planes were, compared to the radial dimensions of the wheel relatively close together. Balancing was very sensitive to small displacements of the balancing mass connected to one of the at least two balancing plane.

However, as the inventors found balancing is facilitated and therefore improved if the color disc is modified. Within such a modification the size of the color disc along the rotation axis is artificially increased. The one skilled in the art would not increase this size because space is always an issue in these imaging projectors. However the artificially increased size along the rotation axis provides the basis for choosing the second balancing plane sufficiently separated form the first balancing plane.

In the following the invention will be described in more detail on the basis of examples and with the help of figures. It is to be understood that these examples are not meant to be limiting the scope of the invention to these examples.

BRIEF DESCRIPTION OF THE DRAWINGS

FIG. 1 Prior art disc shaped color wheel showing balancing method

FIG. 2 One embodiment of Colorwheel modified according to the present invention

DETAILED DESCRIPTION OF THE PREFERRED EMBODIMENTS

Figure 3:
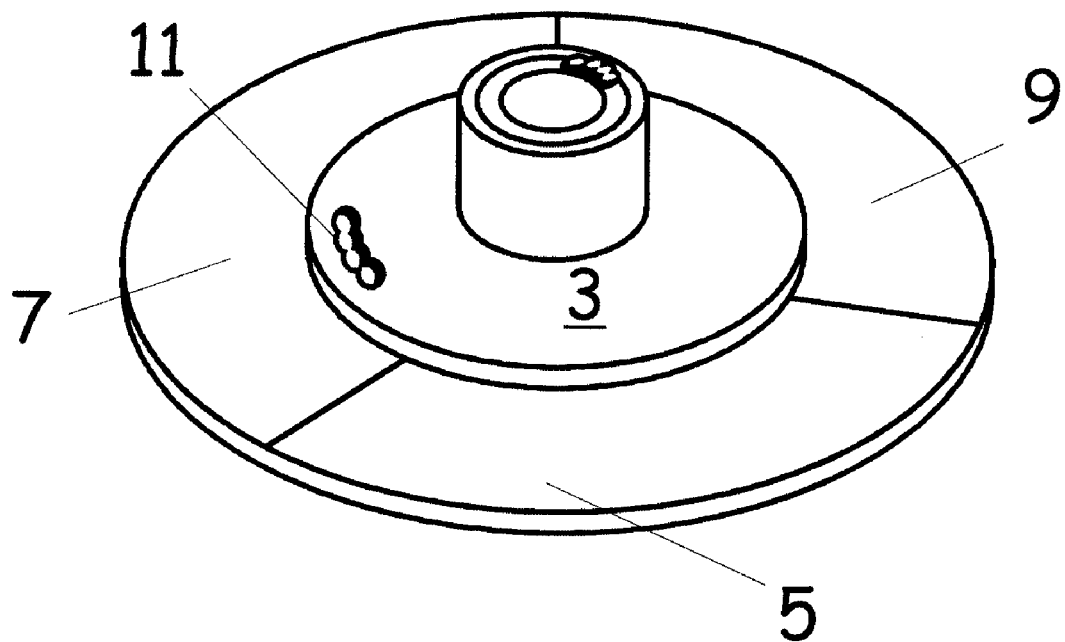
FIG. 3 Another preferred embodiment according to the present invention

In the following the invention is described with the help of the figures in more detail. Several preferred embodiments are discussed. However in the next section a typical prior art solution will be described first in order to specifically point out the advantages of the present invention over prior art. The first figure show schematically a color disc 1 according to prior art. Shown is a disc shaped carrier 3 and three color filter segments 5, 7 and 9. In the disc shaped carrier 3 there is a material removal section 1 where material is removed in order to balance the wheel on only a first plane.

In order to balance the color wheel, it is clamped in the fixture of a balance machine and spun up to 9000 rpm. The balance machine detects the forces created by the rotating unbalanced color wheel and based on that, with the help of algorithms, calculates the required mass and angle of the material to be added or removed to balance the color wheel The balance machine is therefore able to determine what the required balance readings are for the parallel rotation regime. An operator then removes the color wheel and places it in the drill station fixture. The operator manually drills out the required amount of material of the color disc to achieve a balanced color wheel. Prior art balancing is therefore limited to a single plane.

As mentioned above, according to the present invention, even for the color wheels with disc shaped rotors dual plane balancing is performed. This could be for example done on the front side of the color disc and on the back side of the color disc.

It is difficult to perform the dual plane balancing on such a color wheel with a disc shaped rotor. Therefore an improved solution according to the present invention is to modify the color disc in such a way that a basis for a second plane of material removal is created. This can be achieved by for example adding to the color disc an additional body which is rotational symmetric. The symmetry axis should be well aligned with this rotational axis of the rotor. In FIG. 2 shown in addition is a cylindrical body 13 on top of the disc shaped carrier 3. The symmetry axis of the cylindrical massive body 13 is parallel and aligned to the rotational axis of the color wheel. Note that disc shaped carrier 3 and cylindrical massive body 13 could be formed a single part. Note as well that the body 13 could have the shape of a massive cylinder, a hollow cylinder ring or any at least approximately rotational symmetric body. Shown in the figure apart from the first material removal section 11 as well is a second material removal section 15 within a second plane, well separated to the first plane. Both planes are perpendicular to the rotational axis. The distance of the first and the second plane should be kept as small as possible in order to keep the color wheel assembly small. The distance should be kept as large as necessary in order to allow for a reliable dual plane balancing.

As the inventors found the required minimum distance of the planes for easy to perform reliable dual plane balancing can be related to the inertia radius $R_I$ which is a characteristic dimension of the color disc and will be defined in the following.

The moment of inertia I is defined as $$I = \int_M r^2 \, dm = \int_V r^2 \rho \, dV$$

where M is the total weight of the rotating parts p is the density distribution and V is the total volume of the rotating parts. The same moment of inertia can be achieved with a rotor where all of the mass is concentrated on a circle. This means for the density distribution in cylinder coordinates:

$$\rho(r, \varphi, z) = \frac{M}{2\pi R_I} \delta(R_I - r)\delta(z)$$

where $\delta(x)$ is the delta function for which the relation holds $\int f(x)\delta(x_0 - x)dx = f(x_0)$ and where $R_I$ is the radius of the circle. Throughout this specification we will name this radius as inertia radius.

For the moment of inertia then the relation holds:

$$I = \int_V r^2 \rho \, dV = \frac{M}{2\pi R_I} \int r^2 \delta(R_I - r)\delta(z) r \, dr \, d\varphi \, dz$$

$$= \frac{M}{2\pi R_I} R_I^3 \cdot 2\pi = M R_I^2$$

As the inventors found, the distance of the two planes should be at least 0.25 times the inertia radius. Therefore, if $R_I$ is the inertia radius of the color wheel to be balanced and D is the distance between the two balancing planes, for an inventive wheel according to the present preferred embodiment the relation holds:

$$D = k \cdot R_I,$$

where k is at least 0.25, however it is preferred that k substantially equals 0.5

For a typical color disc as it is used today, the inertia radius is at approximately about 20 mm. Therefore the two balancing planes should be spaced at least with a distance of 5 mm (k=0.25), preferably the two planes are spaced by 10 mm (k=0.5).

For geometrical reasons k>10 does not make sense any more, since optical elements within a projection system need to be as small as possible FIG. 3 shows a second preferred embodiment. This is very much like the embodiment of FIG. 2; however the second material removal section is replaced by a material adding section. For this a groove is foreseen where material, such a adhesive could be located in order to balance the wheel.

Figure 4:
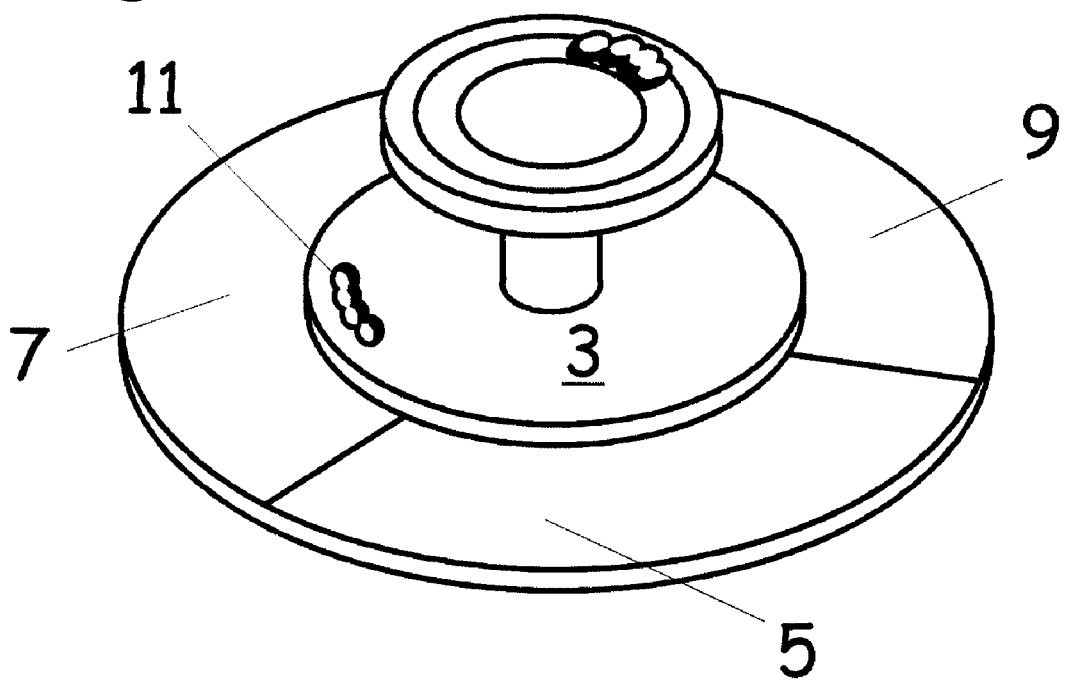
FIG. 4 Another preferred embodiment according to the present invention

FIG. 4 shows a third preferred embodiment. Here, no cylindrical body is used, but a second disc is used, well spaced apart from the first disc of the disc shaped carrier.

Figure 5:
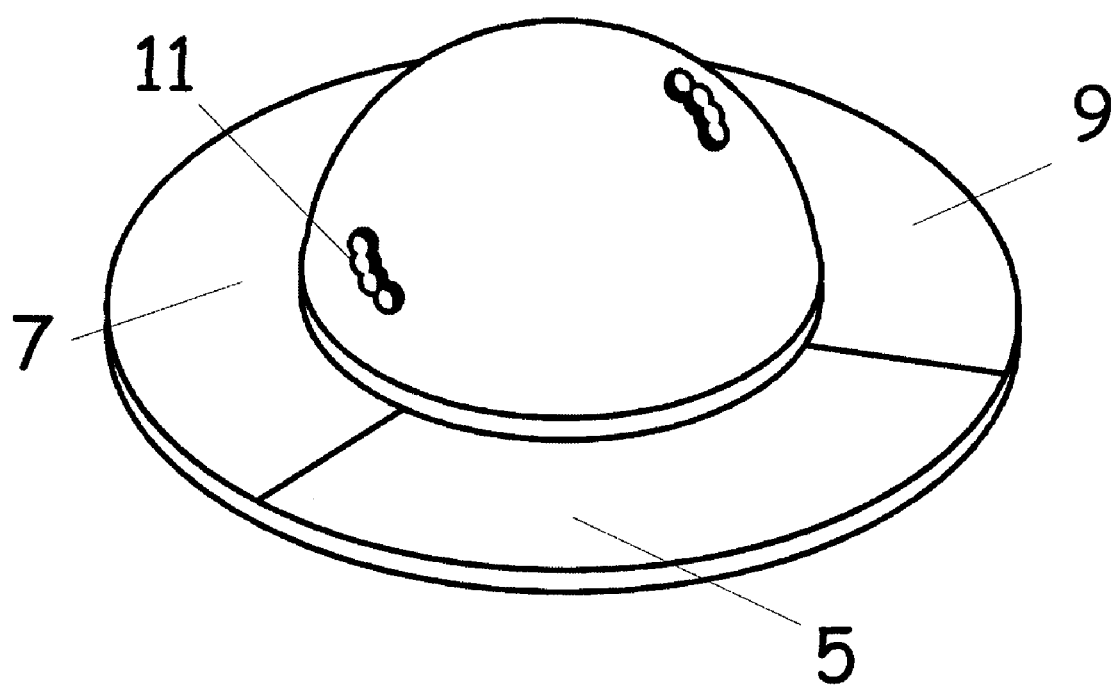
FIG. 5 Another preferred embodiment according to the present invention

FIG. 5 shows another embodiment according to the present invention. Shown here is a half sphere which is fixed to the center of the color disc. The advantage with such an embodiment is that due to the symmetry of the half sphere no care has to be taken for properly orienting the rotational axis of the body to the rotational axis of the wheel. If for example a cylinder is used, the cylinder axis has to be well aligned with the rotational axis of the color wheel in order not to introduce additional unbalance.

This invention could be applied for different bearing types. Very different for example are air bearings and sleeve bearings. In general the balance machine uses the same mechanics to obtain unbalance readings for air bearing or sleeve bearing.

As already mentioned it is possible to add or to remove material with the process. In addition it is possible to combine material removal and material adding. The difference is determining how much to remove from the ColorWheel for the material removal process or how much material to add in the material addition process.

The dual plane balancing method can be used for color wheels with air bearings. However the use of the dual plane balancing method for color wheels with sleeve bearing motors has the astonishing and advantageous effect that in addition the lifetime of the motor is increased. Therefore even if the vibrations with single plane balancing are already at a level which is low enough for the application, it is of advantage to go to dual plane balancing in order to increase lifetime.

It should be noted that, different to the examples discussed here, the two planes for the dual plane balancing can be positioned in such a way that they sandwich the color segment disc.

This is especially advantageous if even longer lifetimes for sleeve bearings are required. In this case it is a preferred embodiment if the planes sandwich the segments of the color disc.

However it will be cheaper to provide both planes for balancing on one side of the color segment disc has the advantage that the balancing itself can be quite easily processed if the motor is on the side opposite to the side of the balancing plane.

The embodiments described have all in common that they are color wheels comprising in combination a rotor and a motor for rotating the rotor, the rotor comprising a ring shaped translucent area formed by color filter segments, the translucent area being adapted to continuously extend into a light path as the rotor is rotated, the rotor in a first plane perpendicular to the axis of rotation further comprising first means for balancing, the rotor in a second plane perpendicular to the axis of rotation further comprising second means for balancing, wherein first and second plane are spaced apart.

Some of them are color wheels wherein the first and the second plane are spaced apart by a distance D with $D=k*R_I$; wherein $R_I$ is the inertia radius of the rotor and k is a factor of at least 0.25. Preferably k is at maximum 10. Even more to prefer is the case where k substantially equals 0.5

Some embodiments are color wheels comprising in combination a rotor and a motor for rotating the rotor, the rotor comprising a ring shaped translucent area formed by color filter segments, the translucent area being adapted to continuously extend into a light path as the rotor is rotated, the rotor in a first plane perpendicular to the axis of rotation further comprising first means for balancing, the rotor further comprising an additional rotational symmetric body, the rotor in a second plane perpendicular to the axis of rotation further comprising second means for balancing, the rotor further comprising an additional rotational symmetric body adopted to comprise the second means for balancing and allowing the first and the second plane to be spaced apart.

Some of the color wheels with the additional rotational symmetric body are color wheels wherein the first and the second plane are spaced apart by a distance D with $D=k*R_I$; wherein $R_I$ is the inertia radius of the rotor and k is a factor of at least 0.25. Preferably k is at maximum 10. Even more to prefer is the case where k substantially equals 0.5.

In a preferable embodiment at least part of the rotational symmetric body substantially has the shape of a cylinder. In another preferable embodiment at least part of the rotational symmetric body substantially has the shape of a half sphere.

In another preferable embodiment the rotational symmetric body has an axial length of at least $D_{al}=D=k*R_I$, wherein $R_I$ is the inertia radius of the rotor and k is a factor of at least 0.25. In this case it is convenient to place first and second balancing means on the rotational symmetric body.

However some embodiments of the present invention comprise a color wheel comprising in combination a rotor and a motor for rotating the rotor, the rotor comprising a ring shaped translucent area formed by color filter segments, the translucent area being adapted to continuously extend into a light path as the rotor is rotated, the rotor in a first plane perpendicular to the axis of rotation further comprising first means for balancing, the rotor in a second plane perpendicular to the axis of rotation further comprising second means for balancing, wherein the ring shaped translucent area is positioned between the first and the second plane.

Some of the color wheels where the ring shaped translucent area is positioned between the first and the second plane are color wheels wherein the first and the second plane are spaced apart by a distance D with $D=k*R_I$; wherein $R_I$ is the inertia radius of the rotor and k is a factor of at least 0.25. Preferably k is at maximum 10. Even more to prefer is the case where k substantially equals 0.5

What is claimed is:

1. A color wheel comprising in combination
a rotor and
a motor for rotating the rotor;
the rotor comprising a ring shaped translucent area formed by color filter segments,
the translucent area being adapted to continuously extend into a light path as the rotor is rotated;
the rotor in a first plane perpendicular to the axis of rotation further comprising first means for balancing,
the rotor further comprising an additional rotational symmetric body that includes a second plane perpendicular to the axis of rotation further comprising second means for balancing;
wherein the first and the second planes are spaced apart by a distance D with $$D=k*R_I$$

wherein $R_I$ is the inertia radius of the rotor and k is a factor of at least 0.25.

2. A color wheel according to claim 1 wherein k is at maximum 10.

3. A color wheel according to claim 1 wherein k substantially equals 0.5.

4. A color wheel comprising in combination
a rotor and
a motor for rotating the rotor;
the rotor comprising a ring shaped translucent area formed by color filter segments,
the translucent area being adapted to continuously extend into a light path as the rotor is rotated;
the rotor in a first plane perpendicular to the axis of rotation further comprising first means for balancing,
the rotor further comprising an additional rotational symmetric body that includes a second plane perpendicular to the axis of rotation further comprising second means for balancing;
wherein the first plane and the second plane are spaced apart;
wherein the rotational symmetric body has an axial length of at least $D_{al}=D=k*R_I$ wherein $R_I$ is the inertia radius of the rotor and k is a factor of at least 0.25.

5. A color wheel comprising in combination a rotor; and a motor for rotating the rotor;

the rotor comprising a ring shaped translucent area formed by color filter segments, the translucent area being adapted to continuously extend into a light path as the rotor is rotated;

the rotor in a first plane perpendicular to the axis of rotation further comprising first means for balancing, the rotor in a second plane perpendicular to the axis of rotation further comprising second means for balancing; and wherein the ring shaped translucent area is positioned between the first and the second plane;

wherein the first and second planes are spaced apart by a distance D with $$D = k * R_I$$

wherein $R_I$ is the inertia radius of the rotor and k is a factor of at least 0.25.

6. A color wheel according to claim 5 wherein k is at maximum 10.

7. A color wheel according to claim 5 wherein k substantially equals 0.5.

8. A color wheel comprising in combination a rotor and a motor for rotating the rotor;

the rotor comprising a ring shaped translucent area formed by color filter segments, the translucent area being adapted to continuously extend into a light path as the rotor is rotated;

the rotor in a first plane perpendicular to the axis of rotation further comprising first means for balancing, the rotor further comprising an additional rotational symmetric body that includes a second plane perpendicular to the axis of rotation further comprising second means for balancing;

wherein the first and second planes are spaced apart;

wherein the second means for balancing is configured for adding material and for removing material.

9. A color wheel comprising in combination a rotor; and a motor for rotating the rotor;

the rotor comprising a ring shaped translucent area formed by color filter segments, the translucent area being adapted to continuously extend into a light path as the rotor is rotated;

the rotor in a first plane perpendicular to the axis of rotation further comprising first means for balancing, the rotor in a second plane perpendicular to the axis of rotation further comprising second means for balancing; and wherein the ring shaped translucent area is positioned between the first and the second plane;

wherein the second means for balancing is configured for adding material and for removing material.

* * * * *